(12) United States Patent
Klein et al.

(10) Patent No.: US 6,268,409 B1
(45) Date of Patent: Jul. 31, 2001

(54) AQUEOUS DISPERSION OF BINDING AGENTS, METHOD FOR THE PRODUCTION THEREOF AND CATHODIC ELECTRODEPOSITION PAINTS

(75) Inventors: Klausjörg Klein, Wuppertal (DE); Helmut Hönig, Graz (AT)

(73) Assignee: Herberts GmbH & Co. KG, Wuppertal (DE)

( * ) Notice: Subject to any disclaimer, the term of this patent is extended or adjusted under 35 U.S.C. 154(b) by 0 days.

(21) Appl. No.: 09/381,228

(22) PCT Filed: Mar. 4, 1998

(86) PCT No.: PCT/EP98/01221

§ 371 Date: Sep. 17, 1999

§ 102(e) Date: Sep. 17, 1999

(87) PCT Pub. No.: WO98/41586

PCT Pub. Date: Sep. 24, 1998

(30) Foreign Application Priority Data

Mar. 19, 1997 (DE) .............................................. 197 11 398

(51) Int. Cl.⁷ ............................ C08K 3/203; C08L 63/02
(52) U.S. Cl. ........................... 523/404; 525/523; 525/526
(58) Field of Search ............................. 523/404; 525/523, 525/526

(56) References Cited

U.S. PATENT DOCUMENTS

| 4,170,579 | * 10/1979 | Bosso et al. ........................ 523/404 |
| 4,659,800 | 4/1987 | Daimer . |
| 4,683,285 | 7/1987 | Paar . |

FOREIGN PATENT DOCUMENTS

| 0 183 025 | 2/1974 | (EP) . |
| 0 012 463 A1 | 6/1980 | (EP) . |
| 0 193 102 A2 | 9/1986 | (EP) . |
| 0 612 818 A1 | 8/1994 | (EP) . |

* cited by examiner

*Primary Examiner*—Robert Dawson
*Assistant Examiner*—D. Aylward
(74) *Attorney, Agent, or Firm*—Pillsbury Winthrop LLP

(57) ABSTRACT

The invention relates to a binder (A) in aqueous dispersion which is obtainable by neutralization of the tertiary amino groups of an amino-epoxy resin a1) with acid and reaction of the resulting product with a polyepoxide a2) to form quaternary ammonium groups and conversion into an aqueous dispersion with water. The invention furthermore relates to a process for the preparation of binders (A) in aqueous dispersion and their use in cathodic electrodeposition lacquers.

14 Claims, No Drawings

AQUEOUS DISPERSION OF BINDING AGENTS, METHOD FOR THE PRODUCTION THEREOF AND CATHODIC ELECTRODEPOSITION PAINTS

FIELD OF THE INVENTION

The invention relates to amino-epoxy resins of increased molecular size, a process for their preparation and cathodic electrodeposition lacquers (CEL) which comprise one or more amino-epoxy resins prepared by the process according to the invention as additional binders.

BACKGROUND OF THE INVENTION

EP-A-0 612 818 describes cathodic electrodeposition lacquers which comprise, in addition to an acid-neutralized CEL binder, crosslinked polymer microparticles which have been prepared by mixing an acrylic polymer with tertiary amine functions and a polyepoxide, dispersing the mixture in an aqueous medium and heating the dispersion for the purpose of crosslinking.

Cathodic electrodeposition lacquering is an industrial process which is susceptible to impurities, which manifest themselves adversely during stoving of the cathodically electrodeposited coats of lacquer as surface defects, for example as craters. The impurities here can originate from the lacquer bath or from the ambient air. Since it is practically impossible to eliminate from the CEL process the impurities which are responsible for the adverse surface phenomena and are often already harmful in traces, the remedy in the past has been addition of additives to the CEL baths. Although the additives help against the undesirable surface defects, they often interfere with the adhesion of coats of lacquer subsequently applied, especially at a higher dosage.

SUMMARY OF THE INVENTION

The object of the invention is to provide binders which can be employed in cathodic electrodeposition lacquers and, when used as additional binders, lead to a reduced sensitivity of cataphoretically deposited coating layers to surface defects, in particular if the coating layers are formed from cathodic electrodeposition lacquers of low pigment content, which are particularly susceptible to surface defects. The binders which can be employed as additional binders in cathodic electrodeposition lacquers should not cause impairment of the adhesion to subsequent lacquer coats.

The object is achieved by providing binders A) in aqueous dispersion which are prepared by neutralizing the tertiary amino groups of an amino-epoxy resin a1) with acid, reacting the resulting product with polyepoxide a2) to form quaternary ammonium groups, and converting the product into an aqueous dispersion with water.

The invention also relates to a process for the preparation of binders A) in aqueous dispersion, in which the tertiary amino groups of an amino-epoxy resin a1) are neutralized with acid, the resulting product is reacted with polyepoxide a2) to form quaternary ammonium groups and the product is converted into an aqueous dispersion with water.

Amino-epoxy resins a1) with tertiary amine groups are known as CEL binders. They can preferably be prepared, for example, by reaction of aromatic epoxy resins with primary and/or secondary mono- and/or polyamines in organic solution or in the melt. If the reaction is carried out in organic solution, solvents or solvent mixtures which can be used are water-miscible solvents, for example alcohols, such as isopropanol, isobutanol and n-butanol; glycol ethers, such as methoxypropanol and butoxyethanol; and glycol ether esters, such as butylglycol acetate, or water-immiscible solvents, such as xylene. Aromatic epoxy resins are aromatic polyglycidyl ethers containing epoxide groups, the term "aromatic epoxy resins" in the context of the present invention also being intended to include those epoxy resin derivatives in which some or all of the epoxide groups of the aromatic polyglycidyl ethers containing epoxide groups have been converted into 5-membered cyclic carbonate groups by reaction with carbon dioxide. The aromatic polyglycidyl ethers originate primarily from the reaction of polyphenols, preferably diphenols, and in particular polynuclear diphenols, with epichlorohydrin. The polyglycidyl ethers, which are aromatic per se, can also contain aliphatic contents. However, they are preferably based exclusively on diphenols. Aromatic epoxy resins which are preferably employed for the synthesis of amino-epoxy resins a1) are those which have or of which the mixture has an epoxide and/or cyclocarbonate equivalent weight of between 170 and 1,000. Particularly preferred aromatic epoxy resins here are the conventional commercially obtainable epoxy resins which primarily originate from the reaction of diphenylolpropane (bisphenol A) with epichlorohydrin. In addition to the primary and/or secondary amino groups, the mono- and/or polyamines can also contain further functional groups, in particular hydroxyl groups and/or tertiary amino groups. Examples of mono- and/or polyamines with primary and/or secondary amino groups and optionally further functional groups are methylamine, ethylamine, propylamine, butylamine, octylamine, 2-ethylhexylamine, dimethylamine, diethylamine, dipropylamine, dibutylamine, methylbutylamine, morpholine, diethylaminoethylamine, dimethylaminopropylamine, laurylpropylenediamine, diethylenetriamine, N,N'-bis-(isohexyl)-1,6-diaminohexane, ethanolamine, propanolamine, ethylene glycol (2-aminoethyl) ether, N-methylaminoethanol or diethanolamine, 1:2 adducts of a diprimary amine, such as 1,6-diaminohexane or 2-methylpentamethylenediamine, and a monoepoxide, such as glycidyl ethers or esters, or monoepoxyalkanes.

The amino-epoxy resins a1) are prepared such that no free amine remains, preferably with complete consumption of the epoxide and/or cyclic carbonate groups of the aromatic epoxy resin(derivative)s. Particularly preferably, the primary and secondary amino groups of the mono- and/or polyamines are converted here completely into tertiary amino groups.

The amino-epoxy resins a1) with tertiary amino groups have a content of amino groups of 35 to 360 milliequivalents per 100 g solid resin. The content of tertiary amino groups, which can be present in the amino-epoxy resin a1) as substituents and/or as a constituent of the polymer backbone, is 35 to 300, preferably 50 to 250 milliequivalents per 100 g solid resin. Particularly preferably, the amino-epoxy resins a1) contain no further amino groups, such as, for example, primary and/or secondary amino groups, in addition to the tertiary amino groups. The amino-epoxy resins a1) contain hydroxyl groups as a result of the ring-opening addition of primary and/or secondary amino groups on to the epoxide groups and/or cyclic carbonate groups of the epoxy resin(derivative)s and preferably additionally originating from hydroxy-functional builder components of the amino-epoxy resin a1), such as, for example, corresponding alkanolamines. The amino-epoxy resins a1) have hydroxyl numbers of, for example, between 40 and 300, preferably between 50 and 250, particularly preferably between 50 and 220 mg KOH/g solid resin. The amino-epoxy resins a1) can have the conventional chemical modifications for cathodic electrodeposition amino-epoxy resin binders. For example, the amino-epoxy resins a1) can contain urethane groups, polyether groups or polyamide groups. The number-average molecular weights (Mn) of the amino-epoxy resins a1) are, for example, between 1,000 and 10,000.

The tertiary amino groups of the amino-epoxy resins a1) present as a melt or as an organic solution are at least partly neutralized with acid, preferably with carboxylic acids. This can be effected at elevated temperatures of, for example, 30 to 140, preferably 30 to 90° C. Examples of suitable carboxylic acids are formic acid, acetic acid and lactic acid. The acid can be employed in a form diluted with water, but it should be ensured that the amount of water added in this manner does not convert the amino-epoxy resin a1) into an aqueous dispersion, i.e. an amount of water added to the amino-epoxy resin a1) in this manner must be sufficiently small. The neutralization can be carried out such that only the amount of acid which is necessary for carrying out the quaternization reaction and can no longer be determined by acid-base titration after the conclusion of the quaternization is added, so that a content of acid which is optionally still lacking, for example an amount of acid still lacking for achieving an adequate dilutability of the quaternization product A) in water, can be added before subsequent conversion of A) into the aqueous phase. However, it is also possible, and for reasons of a simplified procedure also preferable, to add the total necessary amount of acid completely before the quaternization reaction subsequently to be carried out. The acid optionally not consumed in the course of the quaternization reaction can be determined by acid-base titration. In all cases, an over-neutralization of the amino-epoxy resin a1) or of the quaternization product A) is avoided.

The polyepoxides a2), which can be employed individually or as a mixture, have on average more than one, preferably between 1.5 and 3 epoxide groups per molecule. They are particularly preferably diepoxides. The polyepoxides a2) can be low molecular weight defined compounds or oligomeric or polymeric compounds. The epoxide equivalent weights of the polyepoxides a2) are preferably 87 to 500. Examples of polyepoxides a2) are polyglycidyl ethers of polyfunctional alcohols or multifunctional phenols, in particular diols and/or diphenols, such as e.g. hydrogenated bisphenol A glycidyl ether, hexanediol diglycidyl ether, glycerol triglycidyl ether, diglycidyl hexahydrophthalate, diglycidyl esters of dimer acids, epoxidized derivatives of (methyl)cyclohexene, such as e.g. 3,4-epoxycyclohexylmethyl (3,4-epoxycyclohexane) carboxylate, epoxide-functional poly(meth)acrylate resins, polyalkylene glycol diglycidyl ether or epoxidized polybutadiene. Preferred polyepoxides a2) are aromatic epoxy resins such as primarily originate from the reaction of polyphenols, preferably diphenols, and in particular polynuclear diphenols, with epichlorohydrin. Particularly preferred aromatic epoxy resins here are the conventional commercially obtainable epoxy resins which primarily originate from the reaction of diphenylolpropane (bisphenol A) with epichlorohydrin.

The tertiary amino groups of the amino-epoxy resins a1) neutralized with acid are quaternized by reaction with polyepoxide a2), for example at elevated temperatures, as a rule between 30 and 90° C. During the quaternization, an increase in the molecular size occurs, with complete consumption of the epoxide groups of the polyepoxide a2). Depending on the choice of the amino-epoxy resin a1) and the polyepoxide a2) and the ratios of amounts of a1) to a2), the quaternization which increases the molecular size takes place in the sense of a chain lengthening, a molecular branching or, less preferably, with the formation of an internally crosslinked quaternization product A).

The nature and amount of the amino-epoxy resin a1) and the polyepoxide a2) for the preparation of the quaternization product A) are chosen such that the quaternization product A) has a content of quaternary ammonium groups of 15 to 80, preferably 20 to 60 milliequivalents per 100 g solid resin and a number-average molecular weight (Mn) of 2,000 to infinity (in the case of the less preferred internally crosslinked quaternization product A)), preferably 2,000 to 50,000. The quaternization product A) which can be employed as an additional CEL binder contains, in addition to the quaternary ammonium groups, hydroxyl groups originating from the amino-epoxy resin a1) and formed in the course of the quaternization reaction. In addition to the abovementioned groups, the quaternization product A) preferably also additionally contains neutralized and/or non-neutralized amino groups. The content of titratable acid can be up to 60 milliequivalents per 100 g solid quaternization product A), and the content of titratable acid is preferably 10 to 40 milliequivalents per 100 g solid quaternization product A).

According to the invention, the quaternization product A) is converted into an aqueous dispersion with water. It is essential to the invention that the amount of water used for conversion of the quaternization product A) into the aqueous phase is added after the homogeneous mixing of the polyepoxide a2) with the neutralized amino-epoxy resin a1), for example after the quaternization reaction. The amount of water just sufficient to form the dispersion can be used here, or a larger amount of water is added in order to establish a certain, desired dispersion solids content. The water can be added to the quaternization product A) or vice versa. Elevated temperatures of, for example, 30 to 90° C. can be applied to assist the formation of the dispersion.

Organic solvent optionally contained in the aqueous dispersion of the quaternization product A), in particular water-immiscible solvent, can be removed from the aqueous dispersion down to the desired content, for example by distillation in vacuo. The solvent can also already be distilled off before the formation of the dispersion.

The aqueous dispersions of component A) prepared according to the invention in general have a solids content of 30 to 50 wt. %.

The invention also provides cathodic electrodeposition lacquers, of which the binder solid (without crosslinking agent optionally contained therein) comprises 1 to 50, preferably 2 to 30 wt. % of one or more of the quaternization products A) according to the invention and the weight content lacking to make up to 100 wt. % comprises one or more cathodic electrodeposition binders (CEL binders) B) which self-crosslink or crosslink by means of another agent. In the case of CEL binder systems which crosslink by means of another agent the cathodic electrodeposition lacquers according to the invention comprise a crosslinking agent C) in a resin solids content ratio of 10 to 40 parts of crosslinking agent C): 100 parts of binder as the sum of components A) and B).

According to the invention, the quaternization product A) can be used as an additional binder in cathodic electrodeposition lacquers (CEL baths, CEL coating compositions). The content is 1 to 50, preferably 2 to 30 wt. %, based on the binder solids content (without crosslinking agent C) optionally contained therein) of the cathodic electrodeposition lacquer. The quaternization product A) can be added as an aqueous dispersion prepared according to the invention to the finished CEL bath. It is also possible to add the aqueous dispersion of A) at a suitable point during the preparation of the CEL coating composition, for example by mixing with an aqueous dispersion of a CEL binder B) optionally containing a crosslinking agent C), or with a suitable pigment paste for the preparation of CEL coating compositions.

CEL dispersions which comprise CEL binders B) and optionally a crosslinking agent C) and can be employed for the preparation of CEL baths are known. The CEL binders B) are binders which carry cationic groups or basic groups which can be converted into cationic groups, e.g. amino, ammonium, e.g. quaternary ammonium, phosphonium and/or sulfonium groups. Preferred CEL binders B) are those with basic groups, particularly preferably with nitrogen-containing basic groups, such as amino groups. These groups can be present in quaternized form, or they are converted into cationic groups with a conventional neutralizing agent, e.g. an organic monocarboxylic acid, such as e.g. lactic acid, formic acid or acetic acid, as is familiar to the expert. Such basic resins are, for example, resins containing primary, secondary and/or tertiary amino groups. The amine numbers of such resins are e.g. 20 to 250 mg KOH/g. The weight-average molecular weight (Mw) of the resins is preferably 300 to 10,000. Examples of CEL binders B) are amino(meth)acrylate resins, aminopolyurethane resins and polybutadiene resins containing amino groups. CEL binders B) which are preferred in the context of the invention are amino-epoxy resins, in particular amino-epoxy resins of the type a1) such as are employed in the preparation of the quaternization products A). The CEL binders B) can be self-crosslinking, or they are employed as a mixture with known crosslinking agents C). Examples of such crosslinking agents C) are aminoplast resins, crosslinking agents with terminal double bonds, polyepoxide compounds, crosslinking agents which contain groups which are capable of transesterification and/or transamidation, and in particular blocked polyisocyanates.

CEL dispersions can be prepared by synthesis of CEL binders B) in the presence or absence of organic solvents and conversion into an aqueous dispersion by dilution of the CEL binders B), which have been neutralized with acid beforehand, with water. The CEL binder or binders B) can be present as a mixture with one or more suitable crosslinking agents C) and can be converted into the aqueous dispersion together with these. The organic solvent, if present, can be removed down to the desired content, for example by distillation in vacuo, before or after conversion into the aqueous dispersion.

The subsequent removal of solvents can be avoided, for example, if the CEL binders B) optionally present as a mixture with crosslinking agents C) are neutralized in the low-solvent or solvent-free state, e.g. as a solvent-free melt, with acid at temperatures of, for example, up to 140° C. and then converted into the CEL dispersion with water. It is also possible to avoid the removal of organic solvents if the CEL binders B) are initially introduced as a solution in an olefinically unsaturated monomer which can be polymerized by means of free radicals, or the synthesis of the binder is carried out in a monomer which can be is polymerized by means of free radicals (e.g. styrene) as the solvent, thereafter the mixture is converted into an aqueous dispersion by neutralization with acid and dilution with water, and the monomer which can be polymerized by means of free radicals is subsequently polymerized.

The CEL coating compositions according to the invention are aqueous coating compositions with a solids content of 10 to 30 wt. %, for example 10 to 20 wt. %. This solids content is composed of the resin solids, comprising binders A) and B) and the crosslinking agents C) optionally present, and, optionally contained in the CEL coating compositions, fillers, pigments and the non-volatile conventional additives for lacquers. If the CEL coating compositions according to the invention are pigmented systems, they have a pigment/resin solids weight ratio of, for example, 0.01:1 to 0.7:1, fillers being counted as pigments. Those CEL coating compositions in which the binder solid A) and B) is composed of one or more quaternization products A) according to the invention and one or more amino-epoxy resins B) are preferred in the context of the invention. Particularly preferred binder solids are those which are composed of only one amino-epoxy resin B) of the type a1) and a quaternization product A) based on the same amino-epoxy resin a1). This has the advantage that only one amino-epoxy resin a1) has to be prepared, a portion of which serves as the binder B) in the CEL coating composition according to the invention, while the remaining portion is further processed to a quaternization product A) according to the invention, which is likewise a constituent in the same CEL coating composition.

CEL coating compositions according to the invention with a binder solid of such composition have an outstanding bath stability as an advantageous consequence of the particularly good compatibility of binders A) and B) with one another.

If the CEL coating compositions according to the invention are pigmented CEL coating compositions, these can be prepared by grinding the pigments in component A) and/or B) and completing the formulation by mixing with the still lacking content of component A) and/or B). Preferably, pigmented CEL coating compositions according to the invention are prepared by mixing a CEL binder dispersion B) optionally containing a crosslinking agent C), a dispersion, prepared according to the invention, of a quaternization product A) and a separate pigment paste, where components A) and B) can first be mixed with one another and the pigment paste can then be mixed with the binder mixture of A) plus B), or the pigment paste is first mixed with B) before mixing with A) takes place, or vice versa.

Examples of pigments are the conventional inorganic and/or organic coloured pigments and/or effect pigments, such as e.g. titanium dioxide, iron oxide pigments, carbon black, phthalocyanine pigments, quinacridone pigments, metal pigments, e.g. of titanium, aluminium or copper, interference pigments, such as e.g. aluminium coated with titanium dioxide, coated mica, graphite effect pigments, iron oxide in platelet form and copper phthalocyanine pigments in platelet form. Examples of fillers are kaolin, talc or silicon dioxide. It is also possible to use conventional anticorrosion pigments. Examples of these are zinc phosphate, lead silicate or organic corrosion inhibitors. The nature and amount of the pigments depend on the intended use of the coating composition. If clear coatings are to be obtained, no pigments or only transparent pigments, such as e.g. micronized titanium dioxide or silicon dioxide, are employed. If opaque coating are to be applied, the CEL bath preferably comprises colouring pigments.

As already mentioned, the pigments can be ground in component A) and/or B), or they are preferably dispersed to give separate pigment pastes, e.g. using known paste resins. Such resins are familiar to the expert. Examples of paste resins which can be used in CEL baths are described in EP-A-0 183 025 and in EP-A-0 469 497.

Possible additives are the conventional additives such as are known, in particular, for CEL coating compositions. Examples of these are wetting agents, neutralizing agents, flow agents, catalysts, corrosion inhibitors, antifoams and solvents.

The CEL coating compositions according to the invention can be applied by cathodic electrodeposition in the context of a one-coat or multi-coat lacquering on various substrates which are electrically conductive or have been rendered electrically conductive, in particular metallic substrates, and can be stoved. The CEL coating compositions according to the invention are particularly suitable in the motor vehicle sector, for example for priming motor vehicle bodies or motor vehicle body components.

If the quaternization products A) according to the invention are used as additional binders in CEL coating compositions, coating layers produced from these by cataphoretic deposition show a reduced sensitivity to surface defects, even if the CEL coating compositions are clear lacquers or coating compositions with only a low level of pigmentation, for example CEL coating compositions with pigment/resin solids ratios of less than 0.2:1. The sensitivity to surface defects is particularly low if CEL coating compositions of which the binder solid comprising A) and B) is composed of one or more quaternization products A) according to the invention and one or more amino-epoxy resins B), or particularly preferably of only one amino-epoxy resin B) of the type a1) and a quaternization product A) based on the same amino-epoxy resin a1) are used.

The use of the quaternization products A) according to the invention as additional binders in CEL coating compositions causes no impairment in the adhesion to lacquer coats applied subsequently to the CEL coats.

DETAILED DESCRIPTION OF THE PREFERRED EMBODIMENTS

EXAMPLES

Example 1
(Preparation of Bismuth Lactate)

901 parts of a 70 wt. % solution of lactic acid in water are heated to 70° C. 466 parts of commercially available bismuth oxide ($Bi_2O_3$) are added in portions, while stirring. After a further 6 hours of stirring at 70° C., the mixture is cooled to 20° C. and left for 12 hours without stirring. Finally, the precipitate is filtered off, washed with a little water and ethanol and dried at 50° C.

Example 2
(Preparation of a CEL Dispersion)

a) 832 parts of the monocarbonate of an epoxy resin based on bisphenol A (commercial product Epikote 828) are mixed with 830 parts of a commercially available polycaprolactone polyol (commercial product CAPA 205) and 712 parts of diglycol dimethyl ether and the mixture is reacted with 0.3% $BF_3$ etherate at 70 to 140° C. until an epoxide number of 0 is reached. 307 parts of a reaction product of 174 parts of toluylene-diisocyanate (2 equivalents of NCO) with 137 parts of 2-ethylhexanol with an NCO content of 12.8% are added to this product (solids content 70%, 2 equivalents of carbonate) at 40 to 80° C. in the presence of 0.3% Zn acetylacetonate as a catalyst. The mixture is reacted to an NCO value of 0 and then adjusted to a solids content of 70% with diglycol dimethyl ether.

b) 618 parts of a reaction product of 348 parts of toluylene-diisocyanate (80% 2,4-isomer; 20% 2,6-isomer) with 274 parts of 2-ethylhexanol with a residual NCO content of 12.8% are slowly added to 1,759 parts of a bicarbonate of an epoxy resin based on bisphenol A (commercial product Epicote 1001) at 60 to 80° C. The reaction is continued to an NCO value of 0. The product has a solids content of 70%.

c) 622 parts of the reaction product of 137 parts of 2-ethylhexanol with 174 parts of toluylene-diisocyanate are added to 860 parts of bishexamethylenetriamine, dissolved in 2,315 parts of methoxypropanol, at a temperature of 30° C. (NCO content 12.8%) and the mixture is reacted to an NCO content of 0. 4,737 parts of the reaction product b) and 3,246 parts of the reaction product a) (each 70% in diglycol dimethyl ether) are then added and the mixture is reacted at 60 to 90° C. The reaction is ended at an amine number of 32 mg KOH/g. The product formed is distilled in vacuo to a solids content of 85%.

d) Neutralization is carried out with 30 mmol formic acid/100 g resin. Thereafter, the mixture is heated to 70° C. and bismuth lactate is added in portions, while stirring, in an amount such that 1 wt. % bismuth, based on the solids content, is present in the mixture. The mixture is then stirred at 60° C. for a further 6 hours. After cooling, it is converted into a dispersion with a solids content of 40 wt. % with deionized water.

Example 3
(Preparation of a CEL Dispersion with an Amino-epoxy Resin Binder of the Type a1))

500 parts of a solution of an amino-epoxy resin with a content of tertiary amino groups of 160 milliequivalents per 100 g solid resin, prepared according to EP-A-0 012 463, example I(b), are mixed with 160 parts of a crosslinking agent solution according to EP-A-0 012 463, example II(b) and the mixture is neutralized with 28 parts of lactic acid. Thereafter, it is heated to 60° C. and bismuth lactate is added in portions, while stirring, in an amount such that 1 wt. % bismuth, based on the solids content, is present in the mixture. The mixture is then stirred at 60° C. for a further 6 hours. After cooling, it is converted into a dispersion with a solids content of 40 wt. % with deionized water.

Example 4
(Preparation of a Pigment Paste)

15 parts of acetic acid (50%), 30 parts of a commercially available wetting agent (50%) and 350 parts of deionized water are added to 223 parts of the paste resin according to EP-A-0 469 497 A1 example 1 (55%) using a high-speed stirrer. 12.3 parts of carbon black and 430 parts of titanium dioxide are added thereto. The mixture is adjusted to a solids content of 53 wt. % with deionized water and ground on a bead mill. A stable pigment paste is formed.

Example 5
(Preparation of a Quaternization Product A) According to the Invention)

1,000 parts of a solution of an amino-epoxy resin (70 wt. % in butoxyethanol) with a content of tertiary amino groups of 160 milliequivalents per 100 g solid resin, prepared according to EP-A-0 012 463, example I(b) are neutralized with 33 parts of 50 wt. % formic acid and the mixture is heated to 80° C. 100 parts of deionized water and then 45 parts of an epoxy resin based on bisphenol A (commercial product Epikote 828) are added at 80° C. The reaction product is mixed homogeneously at 80° C. The reaction product is then converted into an aqueous dispersion with a solids content of 35 wt. % by addition of deionized water in portions. During this operation the temperature drops to 45°

C. After cooling, a stable dispersion in which the content of acid determined by titration is 15 milliequivalents per 100 g solid resin is obtained.

Examples 6 a–h
(Preparation of CEL Baths and Coatings)

CEL baths with a solids content of 20 wt. % at various pigment/binder weight ratios are prepared in the conventional manner by mixing CEL dispersions (from example 2 or example 3) with optionally the quaternization product A) from example 5 and deionized water and adding the pigment paste from example 4, with thorough stirring. The CEL baths prepared in this way are each contaminated with 0.25% ASTM oil no. 1 (commercial product of Fuchs Mineral ölwerke GmbH, Mannheim), based on their solids content, as a cratering agent. Conventional phosphated vehicle body steel sheets are coated cataphoretically from the CEL baths in a dry coat thickness of 20 $\mu$m and stoved at 180° C. for 30 minutes. The following table summarizes the composition of the CE lacquer and the test results obtained.

| CEL bath | Resin solids weight composition (without paste resin) from example | | | PBR* | Craters (number/dm$^2$) |
|---|---|---|---|---|---|
| 6a (comp.) | 2 100% | 3 — | 5 — | 0.5:1 | 3 |
| 6b (comp.) | — | 100% | — | 0.5:1 | 2 |
| 6c (comp.) | 100% | — | — | 0.2:1 | 9 |
| 6d (comp.) | — | 100% | — | 0.2:1 | 7 |
| 6e (inv.) | 95% | — | 5% | 0.2:1 | 4 |
| 6f (inv.) | 90% | — | 10% | 0.2:1 | 2 |
| 6g (inv.) | — | 95% | 5% | 0.2:1 | 3 |
| 6h (inv.) | — | 90% | 10% | 0.2:1 | 1 |

*pigment/binder weight ratio
comp. = comparison experiment, inv. = according to the invention

What is claimed is:

1. A water dispersible binder (A), obtained by neutralization of tertiary amino groups of an amino-epoxy resin a1) with acid and reaction of the resulting product with an aromatic polyepoxy resin a2) to form quaternary ammonium groups.

2. A water dispersible binder (A) according to claim 1, wherein the amino group content of the amino-epoxy resin a1) is 35 to 360 meq per 100 g solid resin.

3. A water dispersible binder (A) according to claim 1, wherein the tertiary amino groups of the amino-epoxy resin a1) are at least partly neutralized with the acid.

4. A water dispersible binder (A) according to claim 1, wherein the aromatic polyepoxy resin a2) originates from the reaction of polyphenols with epichlorohydrin.

5. Process for the preparation of binders (A) in aqueous dispersion, comprising preparing the binders by neutralization of tertiary amino groups of an amino-epoxy resin a1) with acid and reaction of the resulting product with an aromatic polyepoxy resin a2) to form quaternary ammonium groups and conversion into an aqueous dispersion with water.

6. Process according to claim 5, wherein amino group content of the amino-epoxy resin a1) is 35 to 360 meq per 100 g solid resin.

7. Process according to claim 5, wherein the tertiary amino groups of the amino-epoxy resin a1) are at least partly neutralized with the acid.

8. Process according to claim 5, wherein the aromatic polyepoxy resin a2) originates from the reaction of polyphenols with epichlorohydrin.

9. Cathodic electrodeposition lacquers, comprising a binder solid which comprises 1–50 wt % of one or more binders (A) according to claim 1 and 99 to 50 wt. % of one or more cathodic electrodeposition binders (B) which are self crosslinking or crosslink by means of another agent, wherein the sum of the components (A) and (B) is 100 wt. % and wherein a crosslinking agent (C) is optionally added in a ratio of 10 to 40 parts by weight per 100 parts by weight of the sum of components (A) and (B).

10. A water dispersible binder (A) according to claim 1, wherein the aromatic polyepoxy resin a2) comprises, on average, between 1.5 and 3 epoxide groups per molecule.

11. A water dispersible binder (A) according to claim 10, wherein the aromatic polyepoxy resin a2) is a diepoxide.

12. An aqueous dispersion comprising a water dispersible binder (A) according to claim 1.

13. Process for the preparation of binders (A) in aqueous dispersion according to claim 5, wherein the aromatic polyepoxy resin a2) comprises, on average, between 1.5 and 3 epoxide groups per molecule.

14. Process for the preparation of binders (A) in aqueous dispersion according to claim 13, wherein the aromatic polyepoxy resin a2) is a diepoxide.

* * * * *